United States Patent
Bromenshenkel et al.

(10) Patent No.: US 11,745,581 B2
(45) Date of Patent: Sep. 5, 2023

(54) DUMP BODY FRONT WALL HEATING CHANNEL

(71) Applicant: Caterpillar Inc., Peoria, IL (US)

(72) Inventors: Timothy J. Bromenshenkel, Tuscola, IL (US); Christopher M. Darrow, Blue Mound, IL (US); Thomas Alworth, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 612 days.

(21) Appl. No.: 16/663,692

(22) Filed: Oct. 25, 2019

(65) Prior Publication Data

US 2021/0122232 A1 Apr. 29, 2021

(51) Int. Cl.
| | |
|---|---|
| B60K 13/06 | (2006.01) |
| B60P 1/28 | (2006.01) |
| B60H 1/03 | (2006.01) |
| B60H 1/00 | (2006.01) |

(52) U.S. Cl.
CPC ......... B60K 13/06 (2013.01); B60H 1/00014 (2013.01); B60H 1/036 (2013.01); B60P 1/286 (2013.01); B60Y 2200/41 (2013.01)

(58) Field of Classification Search
CPC .... B60K 13/06; B60K 13/04; B60H 1/00014; B60H 1/036; B60H 1/00378; B60P 1/286; B60Y 2200/41
See application file for complete search history.

(56) References Cited

U.S. PATENT DOCUMENTS

| | | |
|---|---|---|
| 8,721,006 B2 | 5/2014 | Uranaka |
| 2012/0169109 A1 | 7/2012 | Rivera et al. |
| 2013/0187435 A1* | 7/2013 | Uranaka ................ B60K 13/04 298/17 R |
| 2015/0001910 A1 | 1/2015 | Natarajan et al. |
| 2018/0361848 A1 | 12/2018 | Kesani |

FOREIGN PATENT DOCUMENTS

| | | | |
|---|---|---|---|
| CN | 201211859 | 3/2009 | |
| CN | 203920530 U | * 11/2014 | ............. B60P 1/286 |
| JP | 10016631 | 1/1998 | |
| JP | 2003285683 | 10/2003 | |
| JP | 2012201227 | 10/2012 | |
| JP | 2012201227 A | * 10/2012 | |
| JP | 06517447 | 5/2019 | |

* cited by examiner

Primary Examiner — Jacob M Amick
Assistant Examiner — Charles J Brauch

(57) ABSTRACT

A heating channel for a front wall of a dump body comprises an exhaust inlet provided on the front wall; an exhaust outlet provided on the front wall; and a channel body running continuously from the exhaust inlet to the exhaust outlet. The channel body can have at least one horizontally extending portion and at least one vertically extending portion in a front view of the front wall. The exhaust inlet can be configured to receive exhaust gas output from an internal combustion engine, and the exhaust outlet can be configured to output the received exhaust gas to outside the heating channel.

11 Claims, 2 Drawing Sheets

DUMP BODY FRONT WALL HEATING CHANNEL

TECHNICAL FIELD

The present disclosure relates to dump body front wall heating channel arrangements, and systems, components, and methods thereof.

BACKGROUND

Conventionally, a rear-haul truck may use exhaust gas from its combustion engine to heat internal surfaces of the dump body thereof. The exhaust gas may be routed through the structure of the dump body to heat interior surfaces of the dump body where material carried within the dump body may, at times, freeze in normal operation. Such routing of exhaust gas may enter the front of the dump body and exit somewhere at the back of the dump body. Additionally, in certain cases, structures and/or supports may need to be added to facilitate this heating, which can add weight to the dump body and hence the rear-haul truck.

U.S. Patent App. Pub. No. 2012/0169109 ("the '109 publication") describes a system and method for heating a dump body. The '109 publication describes that the dump body includes a front sheet coupled to the floor and the side sheets, where the front sheet includes one or more bolsters formed within the front sheet. According to the '109 publication, the bolsters represent generally rectangular and hollow channels or passageways in the front sheet and allow air to flow through the dump body. The '109 publication also describes that the bolsters may be formed from appropriate conductive material suitable to transfer heat from air or liquid flowing through the bolters, and exhaust air from an engine may be directed through the bolsters and pass through the dump body rather than being directly expelled through a conventional exhaust system.

SUMMARY OF THE DISCLOSURE

In one aspect, a heating channel for a front wall of a dump body is disclosed. The heating channel can comprise an exhaust inlet provided on the front wall; an exhaust outlet provided on the front wall; and a channel body running continuously from the exhaust inlet to the exhaust outlet. The channel body can have at least one horizontally extending portion and at least one vertically extending portion in a front view of the front wall. The exhaust inlet can be configured to receive exhaust gas output from an internal combustion engine of a haul truck, and the exhaust outlet can be configured to output the received exhaust gas to outside the heating channel.

In another aspect, a front wall of a dump body of a rear haul truck is disclosed. The front wall can be comprised a front face; a rear face opposite the front face; and a continuous heating channel extending from the front face of the front wall, the continuous heating channel traversing a top portion of the front face and a bottom portion of the front face. The continuous heating channel can include an exhaust inlet provided on the top portion of the front face between a side edge of the front wall and a vertical centerline of the front wall in a front view thereof, an exhaust outlet provided on the bottom portion of the front face between the side edge of the front wall and the vertical centerline of the front wall, and a channel body running continuously from the exhaust inlet to the exhaust outlet. The exhaust inlet of the continuous heating channel can be configured to receive exhaust gas output from an internal combustion engine of the rear haul truck, and the exhaust outlet can be configured to output the received exhaust gas to outside the dump body.

And in yet another aspect, dump body of an off-highway rear haul truck configured to be provided on a space frame of the off-highway rear haul truck is disclosed. The dump body can comprise a bottom wall; a pair of opposing sidewalls; a front wall between the opposing sidewalls and extending from the bottom wall; a support structure arrangement extending from and weldably mounted on a front face of the front wall, the support structure arrangement including a first vertical support structure and a second vertical support structure separated from the first vertical support structure in a width direction of the dump body; and a continuous heating channel extending from and weldably mounted on the front face of the front wall. The continuous heating channel can be the only heating channel on the front face of the front wall and may include a down-facing exhaust inlet provided at a first height on the front wall, an outward-facing exhaust outlet provided at a second height on the front wall below the first height, and a channel body extending continuously and without branching from the down-facing exhaust inlet to the outward-facing exhaust outlet, the channel body having a plurality of horizontally extending portions and a plurality of vertically extending portions. The down-facing exhaust inlet can be provided inward of first and second opposing side edges of the front wall, the down-facing exhaust inlet being provided closer to the first side edge of the front wall than to the second side edge of the front wall, and the outward-facing exhaust outlet can be provided at the first side edge of the front wall.

Other features and aspects of this disclosure will be apparent from the following description and the accompanying drawings.

DETAILED DESCRIPTION

Figure 1:
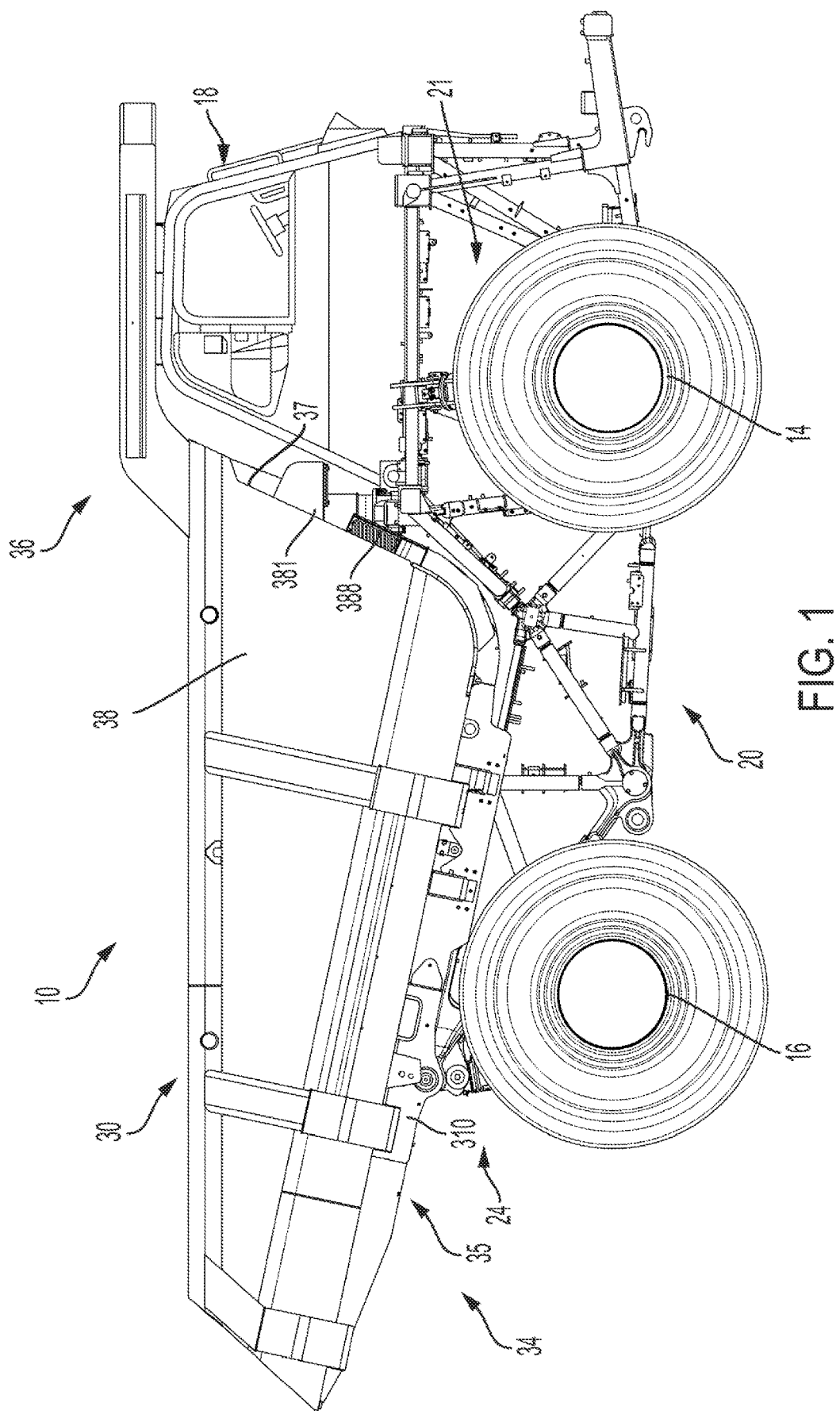
FIG. 1 is a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance. Elongate support members, according to embodiments of the disclosed subject matter, can be in the form of rods and/or tubes, circular, for instance, where some or all of the rods and/or tubes may be solid or hollow. The space frame 20 and corresponding connections can be as set forth in application Ser. No. 16/664,009 filed Oct. 25, 2019 (Case 19-0303), which is incorporated herein by reference in its entirety.

Figure 2:
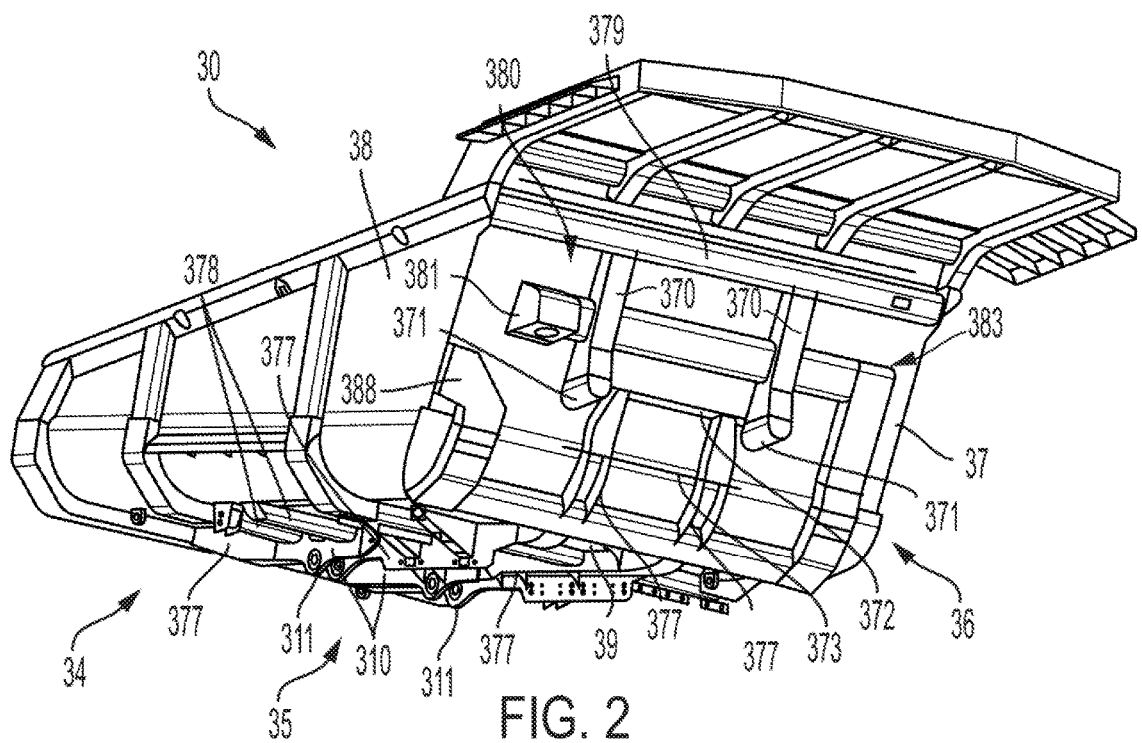
FIG. 2 is a front, side view of a dump body according to embodiments of the disclosed subject matter.

Turning now to FIG. 2, the dump body 30 can have, on a bottom 35 thereof, a rear pivot support 310, and on a front wall 37 thereof, a pair of vertical support structures 370 of a support structure arrangement.

The rear pivot support 310 can be provided at the rear portion 34 of the dump body 30, such as shown in FIG. 2. The rear pivot support 310 can have a pair of rear pivots 311. The rear pivots 311 can be spaced apart from each other in a width or lateral direction of the dump body 30, such as shown in FIG. 2.

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 2, for instance, each rear pivot 311 can be welded in-line with the corresponding longitudinal body support member 377. Thus, the rear pivot 311 can be considered as part of the longitudinal body support member 377 (i.e., integral and/or one-piece with). Additionally, transverse body support members 378 can be received in cut-outs of the rear pivots 311.

A support structure arrangement can be provided (e.g., fixedly mounted) on the front face of the front wall 37 of the dump body 30, where the front wall 37 is between opposing sidewalls 38 of the dump body 30 and extends from one end of a bottom wall 39 at the bottom 35 of the dump body 30. The support structure arrangement can be comprised of a pair of vertical support structures 370 fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the dump body 30.

Figure 3:
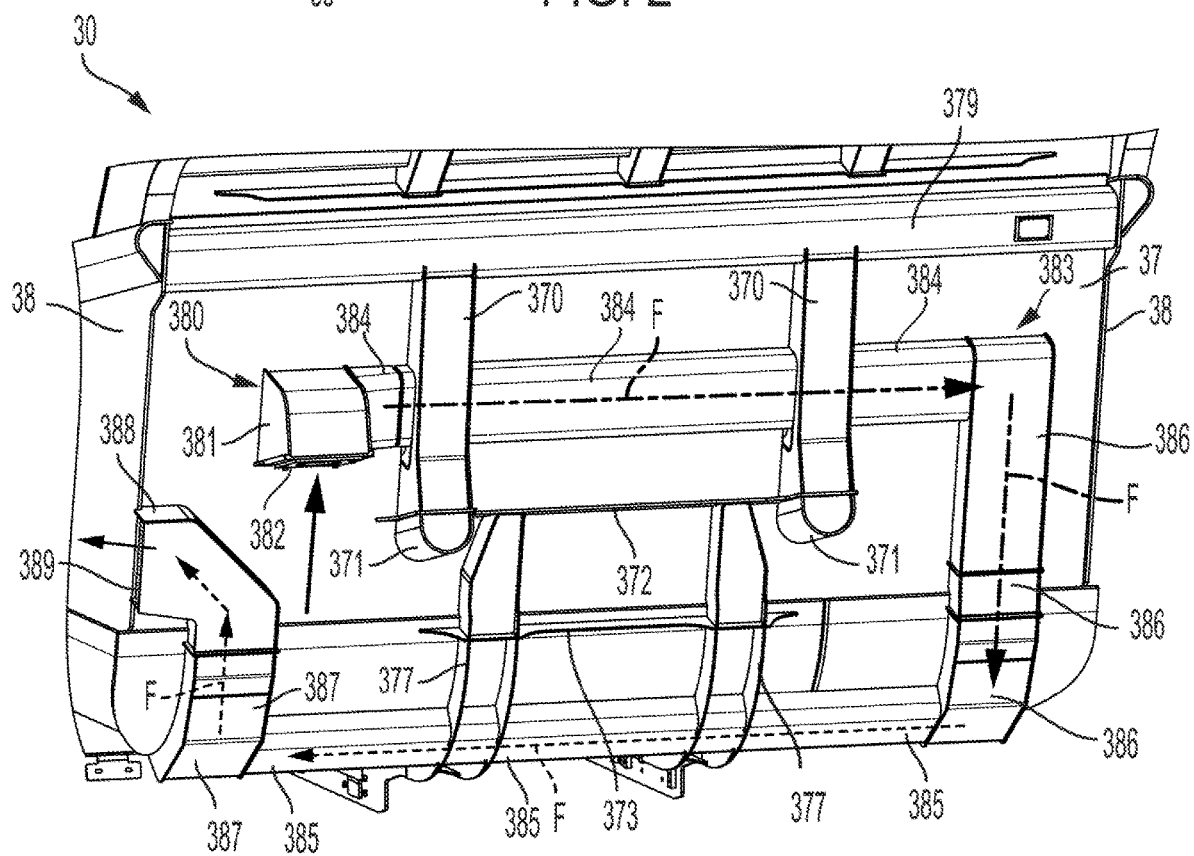
FIG. 3 shows a front wall of a dump body according to embodiments of the disclosed subject matter.

Optionally, the vertical support structures 370 can be hollow elongate support members. According to one or more embodiments, each of the vertical support structures 370 can be formed of shaped sheet metal, for instance, different pieces of shaped sheet metal. Thus, according to one or more embodiments, the vertical support structures 370 may be comprised of a plurality of vertical support structure sections. Optionally, a loading plate 372 may be provided between portions of the vertical support structures 370, for instance, for manufacturing purposes (i.e., placement of the bottom portions of the vertical support structures 370 forming down-facing contact surfaces 371). For example, FIG. 3 shows loading plate 372 separating the bottom portions of the vertical support structures 370 that form down-facing contact surfaces 371 from respective upper portions of the vertical support structures 370.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 20 degrees or less from vertical. According to one or more embodiments, in the side view of the dump body 30 some surfaces may be at one vertical angle and other surfaces may be at another vertical angle. For instance, an upper front surface portion of the vertical support structure 370 may be at an angle 20 degrees from vertical and a lower front surface portion, which may include the bottom portion forming the down-facing contact surfaces 317, can be at or about vertical.

The bottom portions of the vertical support structures 370, as noted above, can form down-facing contact surfaces 371. According to one or more embodiments, the down-facing contact surface 371 can be convex, for instance, semi-cylindrical, such as shown in FIG. 2 and FIG. 3, or elliptical or multi-planar. The down-facing contact surfaces 371 of the vertical support structures 370 can be the same configuration. The down-facing contact surfaces 371 can be configured to be received or seated in upward-facing contact surfaces of support rockers coupled to the space frame 20.

According to one or more embodiments, the vertical support structures 370 may be thicker (i.e., extend more from the front wall 37) at a bottom portion as compared to a top portion. That is, the vertical support structure 370 can taper from thick to thin from the bottom portion to the top portion, which may, according to one or more embodiments, reach a top transverse body support member 379.

A heating channel 380 can be provided on the front face of the front wall 37. Incidentally, the front wall 37 of the dump body 30 may be comprised of a plurality (e.g., two) of front wall portions each extending from one sidewall 38 to the other sidewall 38, such as shown in FIG. 2 and FIG. 3. The heating channel 380, which can be a hollow conduit, can extend from the front face of the front wall 37. Moreover, the heating channel 380 can be fixedly coupled (e.g., welded) to the front face of the front wall 37. As shown in FIG. 2 and FIG. 3, the heating channel 380 may be the only heating channel on the front face of the front wall 37. Optionally, the heating channel 380 may be defined, in part, by the front face of the front wall 37. That is, the front face of the front wall 37 may form a back wall of the heating channel 380.

The heating channel 380 can have an exhaust inlet 381, an exhaust outlet 388, and a channel body 383. The heating channel 380 can run continuously from the exhaust inlet 381 to the exhaust outlet 388. Optionally, the heating channel 380 can extend continuously and without branching from the exhaust inlet 381 to the exhaust outlet 388. According to one or more embodiments, some or all of the heating channel 380 can be formed of shaped sheet metal.

The exhaust inlet 381 may be provided on the front face of the front wall 37 above the exhaust outlet 388. For instance, the exhaust inlet 381 may at a height on the front wall 37 above a height at which the exhaust outlet 388 is provided. The exhaust inlet 381, however, may not be directly above the exhaust outlet 388 in a front view of the dump body 30. According to one or more embodiments, the exhaust inlet 381 and the exhaust outlet 388 may be provided generally closer to one side edge of the front wall 37 than the other side edge of the front wall 37. For example, FIG. 2 and FIG. 3 show the exhaust outlet 388 provided at the left side edge of the front wall 37 in the front view of the dump body 30. FIG. 2 and FIG. 3 also show, as an example, the exhaust inlet 381 provided closer to the left side edge than the right side edge of the front wall 37, i.e., between the left side edge of the front wall 37 and a vertical centerline of the front wall 37 in the front view of the dump body 30. Optionally, with the exception of the exhaust outlet 388, for instance, the channel body 383 can be inward from the perimeter of the front wall 37 at all times. According to one or more embodiments, a portion of the channel body 383 can run along an interface between the front wall 37 and the bottom wall 39.

The channel body 383 can be comprised of a plurality of extending portions, which may be formed in one piece (i.e., integral) with each other or may alternatively be multiple pieces. The extending portions of the channel body 383 can include at least one horizontally extending portion and at least one vertically extending portion. In the context of the extending portions, horizontal and vertical can be defined in terms of the front view of the dump body 30, where in a side view of the dump body 30 vertically extending portions 386, 387 may extend according to an angle of the front wall 37. Thus, in the side view the vertically extending portions 386, 387 may extend substantially vertically, for instance, 20 degrees or less from vertical. Each of the horizontally extending portions and the vertically extending portions may have a channel width greater than a channel height (e.g., generally rectangular in cross-section).

FIG. 2 and FIG. 3, show, for instance, a first horizontally extending portion 384 and a second horizontally extending portion 385. Each of the first horizontally extending portion 384 and the second horizontally extending portion 385 can be comprised of a plurality of horizontally extending sections or segments. FIG. 2 and FIG. 3 also show, for instance, a first vertically extending portion 386 and a second vertically extending portion 387. Each of the first vertically extending portion 386 and the second vertically extending portion 387 can be comprised of a plurality of vertically extending sections or segments. Optionally, a section or segment of the first horizontally extending portion 384 may be considered part of the exhaust inlet 381. Likewise, optionally, a section or segment of the second vertically extending portion 387 may be considered part of the exhaust outlet 388.

According to one or more embodiments, the heating channel 380 can traverse a top portion and a bottom portion of the front face of the front wall 37, such as shown in FIG. 2 and FIG. 3. For example, the heating channel 380 may extend or run continuously from the exhaust inlet 381 to the first horizontally extending portion 384, to the first vertically extending portion 386, to the second horizontally extending portion 385, to the second vertically extending portion 387, to the exhaust outlet 388.

The exhaust inlet 381 may be oriented such that one or more openings thereof can be downward, for instance, directly downward (i.e., vertically) or at a slight angle from vertical (e.g., 5 degrees or less). Thus, the exhaust inlet 381 may, according to embodiments of the disclosed subject matter, be termed a down-facing exhaust inlet. The exhaust inlet 381 may be coupled to an exhaust bellows system that couples an exhaust system of the machine 10, particularly an exhaust outlet, to the exhaust inlet 381. Optionally, a wear plate 382 may be provided between the exhaust inlet 381 and the exhaust bellows system. Generally, exhaust from the prime mover (e.g., internal combustion engine) of the machine 10 can be output, via the exhaust outlet, and provided to the exhaust inlet 381, for instance, via the exhaust bellows system. Exhaust from the prime mover can flow to, through, and out of the heating channel 380 as indicated by the exhaust flow arrows F in FIG. 3.

The exhaust outlet 388 may be oriented such that one or more outlet openings thereof can face outward. For instance, FIG. 2 and FIG. 3 show the outlet opening of the exhaust outlet 388 facing outward in the width direction of the dump body 30, away from the front wall 37 of the dump body 30. Optionally, the exhaust outlet 388 may have at the one or more outlet openings a porous member 389, such as a screen, mesh, or grating. The porous member 389 can be provided to allow output of exhaust from the exhaust outlet 388 but prevent foreign materials from entering the exhaust outlet 388, such as animals and/or debris. Generally, exhaust traversing the exhaust inlet 381 and the channel body 383 can be output from the heating channel 380 by the exhaust outlet 388. The exhaust can be output by the exhaust outlet 388 to outside the front wall 37, for instance, outside of the dump body 30 or outside of the machine 10 to the external environment.

According to one or more embodiments of the disclosed subject matter, the first horizontally extending portion 384 may extend through the vertical support structures 370, such as shown in FIG. 2 and FIG. 3. Optionally, when the first horizontally extending portion 384 extends through the vertical support structures 370, the first horizontally extending portion 384 may extend (i.e., project) from the front face of the front wall 37 less than an amount by which the vertical support structures 370 extend from the front face of the front wall 37, at least where the first horizontally extending portion 384 intersects the vertical support structures 370. Intersecting surfaces of the first horizontally extending portion 384 and each vertical support structure 370 can be fixedly attached via welding, for instance. Moreover, the first horizontally extending portion 384 may provide support for horizontal components of force vectors with respect to a haul load of the machine 10. As a support for horizontal components of force vectors, the first horizontally extending portion 384 may be as set forth in application Ser. No. 16/663,825 filed Oct. 25, 2019 (Case 19-0770), which is incorporated herein by reference in its entirety.

According to one or more embodiments, one or more longitudinal body support members 377 can extend from the bottom wall 39 to the front wall 37 (i.e., transition from horizontal to vertical/substantially vertical). As shown in FIG. 3, for instance, two longitudinal body support members 377 can extend along the front wall 37 such that ends thereof are provided between the vertical support structures 370. The second horizontally extending portion 385 may extend through the longitudinal body support members 377 or otherwise separate portions of the longitudinal body support members 377. Optionally, a loading plate 373 may be provided between portions of the vertical support structures 370, for manufacturing purposes, for instance.

An inner support may be provided at internal corners of the dump body 30 between the sidewalls 38 and a rear face of the front wall 37. Generally speaking, the inner supports can provide protective interfaces between the sidewalls 38 and the front wall 37 to transfer stresses from an actual interface between the sidewalls 38 and the front wall 37. The inner supports can also prevent the internal corners at the interface between the sidewalls 38 and the front wall 37 from being relatively sharp, which may otherwise allow hauling material in the dump body to coalesce at the relatively sharp internal corners.

INDUSTRIAL APPLICABILITY

As noted above, embodiments of the present disclosure relate to dump body front wall heating channel arrangements, and systems, components, and methods thereof.

A heating channel 380 can be provided on the front face of the front wall 37. The heating channel 380, which can be a hollow conduit, can have an exhaust inlet 381, an exhaust outlet 388, and a channel body 383. The heating channel 380 can run continuously from the exhaust inlet 381 to the exhaust outlet 388, for instance, traversing a top portion of the front face and a bottom portion of the front face of the front wall 37, such as shown in the non-limiting example provided in FIG. 2 and FIG. 3.

Generally, exhaust from the prime mover (e.g., internal combustion engine) of the machine 10 can be output, via an exhaust outlet thereof, and provided to the exhaust inlet 381, for instance, via an exhaust bellows system, and exhaust traversing the exhaust inlet 381 and the channel body 383 can be output from the heating channel 380 by the exhaust outlet 388. The exhaust can be output by the exhaust outlet 388 to outside the front wall 37, for instance, outside of the dump body 30 or outside of the machine 10 to the external environment. Exhaust from the prime mover can flow to, through, and out of the heating channel 380 as indicated by the exhaust flow arrows F in FIG. 3.

The heating channel 380 can be provided to heat material carried in the dump body 30. More specifically, the heating channel 380 can route relatively warm exhaust gas received from the exhaust system of the machine 10 along a predetermined path across the front wall 37 of the dump body 30. The relatively warm exhaust gas can prevent freezing of the material carried in the dump body 30. The predetermined path of the heating channel 380 can be based on where material carried in the dump body 30 may be more likely to freeze or need heating, such as peripheral portions of the front wall 37, particularly the bottom of the front wall 37 at the interface with the bottom wall 39 and opposing side edges of the front wall 37.

In that embodiments of the disclosed subject matter can provide a heating channel (i.e., heating channel 380) only on the front face of the front wall 37, embodiments of the disclosed subject matter can balance heating and load-based strength characteristics relative to weight characteristics of the dump body 30. That is, embodiments of the disclosed subject matter can provide suitable heating and load-based strength characteristics while at the same time relatively minimizing weight of the dump body 30 by not providing excess heating channels.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A dump body of an off-highway rear haul truck configured to be provided on a space frame of the off-highway rear haul truck, the dump body comprising:
    a bottom wall;
    a pair of opposing sidewalls;
    a front wall between the opposing sidewalls and extending from the bottom wall;
    a support structure arrangement extending from and weldably mounted on a front face of the front wall, the support structure arrangement including a first vertical support structure and a second vertical support structure separated from the first vertical support structure in a width direction of the dump body; and
    a continuous heating channel extending from and weldably mounted on the front face of the front wall,
    wherein the continuous heating channel is the only heating channel on the front face of the front wall and includes: a down-facing exhaust inlet provided at a first height on the front wall, an outward-facing exhaust outlet provided at a second height on the front wall below the first height, and a channel body extending continuously and without branching from the down-facing exhaust inlet to the outward-facing exhaust outlet, the channel body having a plurality of horizontally extending portions and a plurality of vertically extending portions,
    wherein the down-facing exhaust inlet is provided inward of first and second opposing side edges of the front wall, the down-facing exhaust inlet being provided closer to the first side edge of the front wall than to the second side edge of the front wall, and
    wherein the outward-facing exhaust outlet is provided at the first side edge of the front wall.

2. The dump body of claim 1, wherein the continuous heating channel extends in order, in a front view of the dump body, horizontally from the down-facing exhaust inlet toward but without reaching the second side edge of the front wall, vertically downward toward an interface between the front wall and the bottom wall, horizontally along the interface between the front wall and the bottom wall toward the first side edge of the front wall, and vertically upward toward the outward-facing exhaust outlet.

3. The dump body of claim 1, wherein one of the horizontally extending portions of the channel body extends through the first and second vertical support structures.

4. The dump body of claim 3, wherein said one horizontally extending portion of the channel body that extends through the first and second vertical support structures extends from the front face of the front wall less than an amount by which the first and second vertical support structures extend from the front face of the front wall, at least where said one horizontally extending portion intersects the first and second vertical support structures.

5. The dump body of claim 3, wherein said one horizontally extending portion of the channel body that extends through the first and second vertical support structures is a horizontal support member configured to provide support for horizontal components of force vectors with respect to haul load.

6. The dump body of claim 1, wherein the first and second vertical support structures are elongate structural members spaced in the width direction of the dump body from each other so as to be equally spaced from a vertical centerline of the front wall of the dump body in a front view of the dump body.

7. The dump body of claim 1, wherein the continuous heating channel is defined in part by the front face of the front wall of the dump body opposite the channel body.

8. The dump body of claim 1, wherein each of the horizontally extending portions and the vertically extending portions is generally rectangular in cross-section.

9. The dump body of claim 1, wherein the down-facing exhaust inlet of the continuous heating channel is configured to receive exhaust gas output by an internal combustion engine of the off-highway rear haul truck, and the outward-facing exhaust outlet is configured to output the received exhaust gas to outside the off-highway rear haul truck.

10. A heating channel for a front wall of a dump body comprising:
an exhaust inlet provided on the front wall;
an exhaust outlet provided on the front wall;
and a channel body running continuously from the exhaust inlet to the exhaust outlet,
wherein the channel body has at least one horizontally extending portion and at least one vertically extending portion in a front view of the front wall,
wherein the exhaust inlet is configured to receive exhaust gas output from an internal combustion engine of a haul truck,
wherein the exhaust outlet is configured to output the received exhaust gas to outside the heating channel, and
wherein the heating channel runs, in order, horizontally from the exhaust inlet along a first horizontally extending portion of the at least one horizontally extending portion, then immediately vertically downward along a first vertically extending portion of the at least one vertically extending portion, then immediately horizontally along a second horizontally extending portion of the at least one horizontally extending portion, and then immediately vertically upward along a second vertically extending portion of the at least one vertically extending portion, and immediately toward the exhaust outlet.

11. The heating channel according to claim 10, wherein the first horizontally extending portion and the exhaust inlet are at a height above the second horizontally extending portion and the exhaust outlet.

\* \* \* \* \*